April 13, 1965  A. G. DEAN  3,177,817
RAILWAY PASSENGER TRAIN CAR
Filed Nov. 13, 1962  2 Sheets-Sheet 1
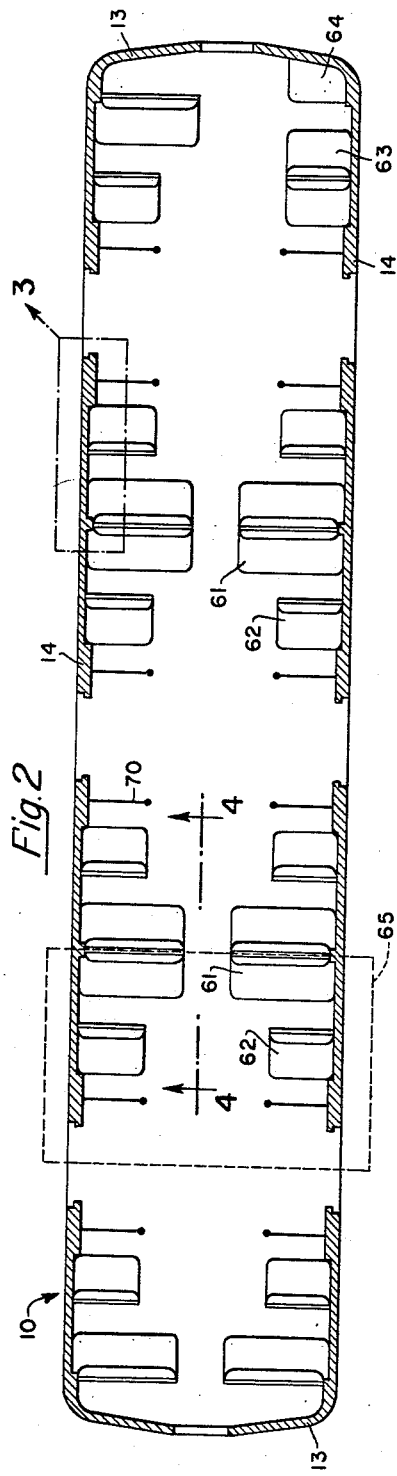
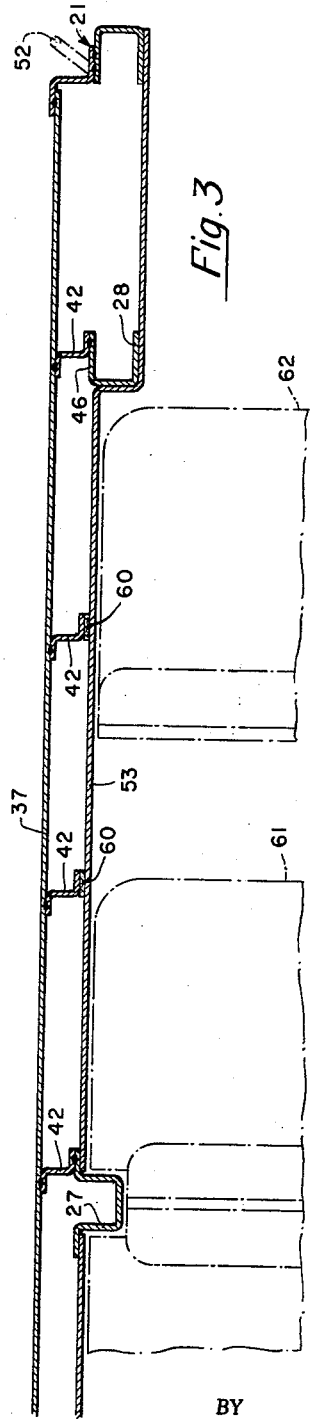
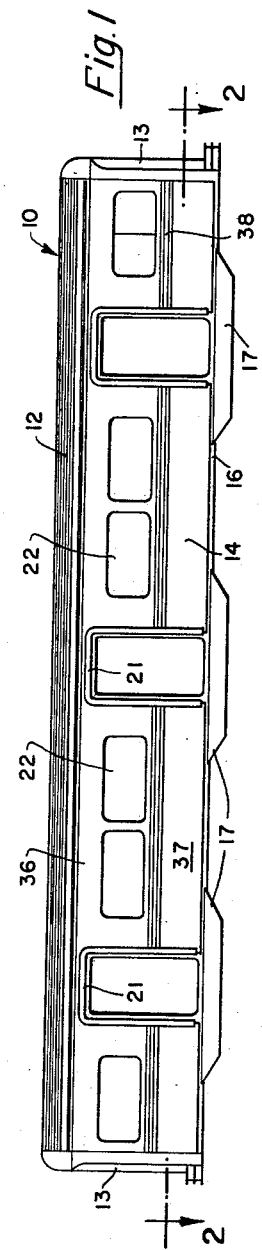
INVENTOR.
ALBERT G. DEAN
BY
*Douglas A. McJechnie*
ATTORNEY April 13, 1965  A. G. DEAN  3,177,817
RAILWAY PASSENGER TRAIN CAR
Filed Nov. 13, 1962  2 Sheets-Sheet 2
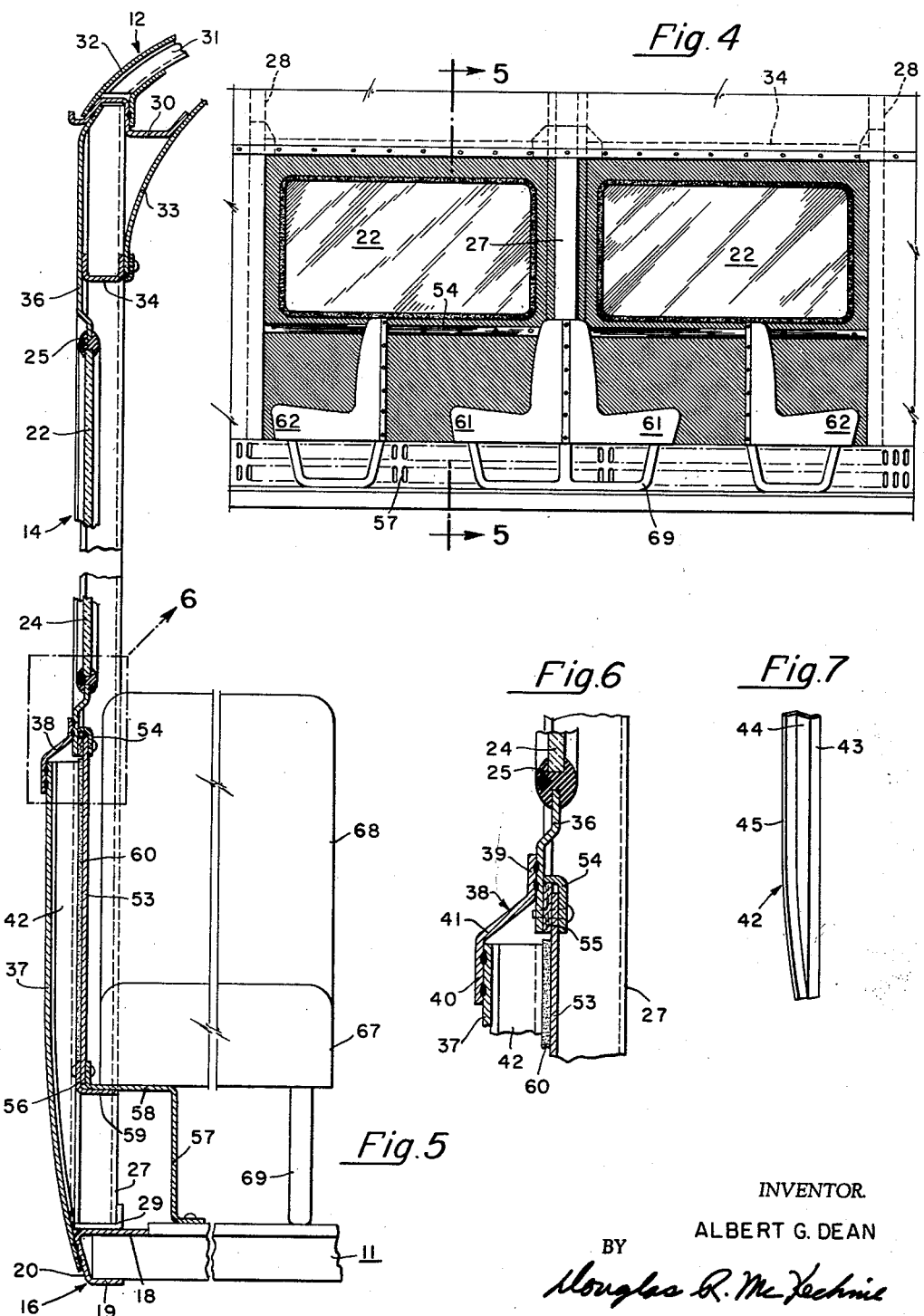
INVENTOR.
ALBERT G. DEAN
BY
Douglas R. McKechnie
ATTORNEY _United States Patent Office_

3,177,817
Patented Apr. 13, 1965

3,177,817
RAILWAY PASSENGER TRAIN CAR
Albert G. Dean, Narberth, Pa., assignor to The Budd Company, Philadelphia, Pa., a corporation of Pennsylvania
Filed Nov. 13, 1962, Ser. No. 237,054
6 Claims. (Cl. 105—401)

This invention relates to railway passenger train cars and has, among its objects, the provision of a car of relatively great interior width and of a novel seating arrangement for such a car.

In the United States, the maximum width of a railway passenger car of the mainline type is determined by the distance between the outside edges of side handholds and this width is customarily 10′6″. Previously, most cars have been constructed so that the side handholds project outwardly from the side walls of the car body and the side walls lie substantially wholly inwardly of the handholds and have a maximum width in the order of 10′0″ over the posts. In rapid transit cars of the platform loading type, the maximum width is usually based on the clearances between the loading platforms and the car side sills, and, in most cars of this type, such clearances define a control line within which the side walls are located. However, for both types of cars such construction is not the most efficient since maximum utilization of available design space is not achieved.

In accordance with one feature of the invention, a novel car body is constructed to provide a relatively wide interior width which, in the case of mainline passenger train cars, permits the use of wider seats and wider lower berths so as to increase passenger comfort. For rapid transit cars, the increased width provides for greater passenger carrying capacity.

In accordance with another feature of the invention, the wide interior width permits the use of a novel seating arrangement which is of modular construction and facilitates rapid loading of the car.

Other objects and advantages of the invention will be apparent from the following description taken in connection with the accompanying drawings wherein:

FIG. 1 is a side elevational view of a rapid transit passenger car embodying the invention;

FIG. 2 is a somewhat schematic top plane view, partly in section, looking generally along lines 2—2 of FIG. 1 and illustrating the seating arrangement;

FIG. 3 is an enlarged detail view of that portion of the car enclosed in reference box 3 of FIG. 2;

FIG. 4 is a side elevational view of a portion of the interior of the passenger car illustrating, by shaded lines, the portion of increased interior width;

FIG. 5 is a vertical cross sectional view taken along lines 5—5 of FIG. 4;

FIG. 6 is an enlarged detail view of that portion enclosed within reference box 6 of FIG. 5; and FIG. 7 is a perspective view of a Z-member embodied in the invention.

Referring now to the drawings, the invention is illustrated as embodied in the car body 10 of a rapid transit car. The car body 10 comprises a floor 11, a roof 12, a pair of end walls 13 and a pair of side walls 14 enclosing a passenger space.

At each side, floor 11 includes a longitudinal side sill 16 which is reinforced beneath each door opening by a side sill reinforcement 17. Side sill 16 includes an upper, horizontal flange 18, a lower, horizontal flange 19 and a vertical, inclined base 20 extending between the outer edges of flanges 18 and 19. The outer edge of flange 18 is at a greater distance from the longitudinal car center line than is the outer edge of flange 19 and base 20 extends downwardly and inwardly from the outer edge of flange 18 to that of flange 19.

Each side wall 14 has a plurality of door openings each bounded above the floor by an inverted, U-shaped door frame 21, and a plurality of equal sized windows 22. In the illustrated embodiment, there are three door frames 21 and six windows 22 in each side wall, there being two windows between adjacent door frames and a single window between each end frame and the adjacent door frame. The window 22a adjacent the operator's cab at the front of the car can be opened. As best seen in FIG. 5, each window 22 comprises a rectangular window pane 24 mounted in a mounting band 25. The windows are elongated and each one services two seats as more fully described hereafter.

Each side wall 14 also includes a plurality of posts 27 of hat-shaped cross section, and a plurality of posts 28 of U-shaped cross section. Each of posts 27 and 28 is straight and vertical and has its lower end welded to an angle bracket 29 (FIG. 5) provided with a vertical flange abutting the lower, inner edge of the associated post for strengthening it against inward, lateral deflection. Brackets 29 are welded to the top of flange 18 of side sill 16. The upper ends of these posts are welded to a longitudinally extending top rail 30 of roof 12, the top rail being connected to a plurality of car lines 31 covered by roof sheathing 32 and ceiling 33. Above windows 22, the side wall is further reinforced by a window header 34 that extends between posts 27 and 28. The details o fthe roof, the end walls and the floor can be of any suitable construction and form no part of the present invention, so that further elaboration is unnecessary.

Each side wall 14 is exteriorly covered by an upper shear panel 36 and a lower shear panel 37 joined by a longitudinal belt rail 38. Belt rail 38 includes a pair of flat, vertical flanges 39 and 40, and an inclined web 41 extending between adjacent edges of the flanges. Upper flange 39 is located in a vertical plane located inwardly of the plane within which flange 40 is located and the adjacent edges are vertically spaced so that web 41 extends downwardly and outwardly from the lower edge of upper flange 39 to the upper edge of lower flange 40. Upper shear panel 36 is flat, except at its upper edge where it curves inwardly under roof 12 and at the window openings where it is bent inwardly to strengthen the panel around the window openings.

Belt rail 38 extends along the side wall beneath the window level and has the inside of upper flange 39 welded to the outside of shear panel 36 adjacent the lower edge thereof. The upper edge of the lower shear panel 37 is welded to the inside of lower flange 40 of belt rail 38. Lower shear panel 37 extends downwardly from belt rail 38 and, as best seen in FIG. 5, curves inwardly, the lower edge of shear panel 37 abutting and being welded to the outer surface of base 20 of side sill 16. The inclinations of base 20 and the lower edge of shear panel 37 are equal.

Posts 27 open outwardly and are located halfway between adjacent door frames and extend upwardly between the adjacent windows 22, whereas posts 28 open longitudinally and are located adjacent the other ends of the windows. The "hat" of post 27 extends inwardly so that the opposite surfaces of the post flanges face outwardly and are coplanar with each other and with the outermost edge of the side sill. Posts 28 have an outer surface 46 (FIG. 3) coplanar with the outermost edge of the side sill. Upper shear panel 36 is spot-welded to the outer surfaces of posts 27 and 28 and thus has its flat portion lying in a plane "over" or "outside" the posts.

Lower shear panel 37 is strengthened by a plurality of curved Z-members 42 each comprising a flat vertical inner flange 43, a flat vertical web 44 and an outer flange 45 welded to the inside of shear panel 37 and having a curvature conforming to the curvature of this panel. The upper edges of members 42 terminate at the same height as the upper edge of shear panel 37 whereas the lower edge of members 42 terminate outwardly of bracket 29. Thus, flange 45 curves inwardly until the lower edge thereof is aligned with the lower edge of inner flange 43.

With reference to FIG. 3, each post 27 has one of its flanges welded to a Z-member 42 and the outer surface 46 of each post 28 is welded to another Z-member. Between these two Z-members and beneath the windows, there are two additional Z-members 42 which are welded only to the inside of shear panel 37.

Note that although shear panel 37 is curved, posts 27 and 28 are straight and thereby provide a structure much stronger than if the posts were curved to conform to the curvature of the panel. Note also that above the belt rail, the exterior profile is normal so that the car can be used on most rail systems.

A wainscot 53 is connected along its upper edge to the lower edge of upper shear panel 36 by a longitudinal trim 54, there being a cork filler strip 55 between the adjacent edges of the upper panel and the wainscot. The lower edge of the wainscot is sandwiched between vertically extending flanges of an angle 56 and a heater duct 57, the angle being suitably connected at its ends to the posts. Heater duct 57 encloses a heating unit (not shown) and has an upper portion 58 which rests on the inwardly extending flange 59 of angle 56 and presents an upwardly facing surface upon which the outer edge of a seat is supported.

Since the wainscot is connected to or abuts the flanges of the post 27, it will be thus apparent that the interior width of the car is measured substantially over the posts instead of to the inside of the posts as in most prior art cases. At its widest portion, the inside width is equal to the width over the posts less the thicknesses of the flanges of post 27 and of the wainscot. Since the outside surface of wainscot 53 abuts the inside surfaces of the flanges of the post 27, the two Z-members beneath each window are spaced from the wainscot a distance equal to the thickness of the flanges. Each of these spaces is filled by a cork filler strip 60 interposed between the wainscot and the Z-member.

Above trim 54, the inside surfaces of posts 27 and upper shear panel 36 are exposed. These surfaces can either be suitably finished or covered for decorative purposes.

With reference to FIG. 3, a side handhold 52 can be mounted, if desired, on the door frame 21, as shown. In the drawing, the side handhold is shown in dotted lines merely to illustrate the principle of construction that the widest portion of the lower shear panel can extend out to the outer limits of the side handholds. Normally, however, in a car of the type illustrated, side handholds are not provided. Thus, where the widest exterior portion is taken out to 10'6" (the maximum distance over side handholds), the interior width measured over the posts can be in the order of 10'3".

By providing such a wide interior, the novel seating arrangement, best seen in FIGS. 2 and 4, can be used. With reference to these figures, the car comprises a plurality of 3-passenger seats 61 and of 2-passenger seats 62 arranged in alternate reverse modules one of which is indicated generally by dotted box 65. Each of the modules is the same except for the one at the front of the car which is modified as shown to accommodate an attendant's seat 63 and a control panel 64.

The modules are arranged on opposite sides of each of the door openings so that the seats face the adjacent openings. Each module comprises two 2-passenger seats 62 arranged adjacent to the door on opposite sides of the aisle and a pair of 3-passenger seats 61 located on opposite sides of the aisle and facing the back of the 2-passenger seats. Between the laterally adjacent 3-passenger seats, the aisle width can be relatively narrow in the order of 1'3", so that it would tend to restrict the flow of passengers up and down the aisle and thereby cause the passengers to use the closest doors, thus facilitating rapid loading of the vehicle. Thus, within each module, the seats face the most accessible door opening and are arranged in bilateral symmetry about the car center line. The seats of adjacent modules are bilaterally symmetrical about a transverse center line between adjacent modules.

Each of the seats comprises a cushion 67, a backrest 68 and a pedestal 69 at the inner edge of the seat. The outer edge of the seat is supported on the upper portion 58 of heater duct 57 and the backs of adjacent 3-passenger seats are cut out so that the backrests curve around the post 27. With such an arrangement, the outer edges of the seats can be spaced away from the wainscot panel in the order of 1 inch or so of clearance so that the weight of the passenger can expand the cushion into engagement with the wainscot and so that the passenger can overhang the seat and engage the wainscot.

The standing space thus afforded around each door opening between the modules facing such opening is generally diamond-shaped so that, upon entering the car, the passengers can fan out in opposite directions towards available seats and available standing space. To protect the passengers in the 2-passenger seats, panels or rails 70 can be provided.

It should be noted that the 2-passenger seats are transverse whereas in most prior art cars, the seats adjacent the doors are longitudinal. Thus, while longitudinal seats appear to occupy less space, the feet of the passengers using such seats are likely to occupy more space, and thereby afford less standing space. Also, note that the 2-passenger seats are set back from the edge of the door opening to provide a maximum standing space in the vicinity of the doors.

While only a single embodiment has been illustrated, it will be apparent to those skilled in the art that many changes can be made in the details of construction and arrangement of parts without departing from the scope of the invention as defined in the appended claims.

What is claimed is:

1. In a railway car body, the combination of: a roof; a floor having a side sill; a plurality of upright, straight posts longitudinally spaced throughout the length of the car body, each post being connected at one of its ends to the side sill and at its other end to the roof, said posts extending upwardly above and inboard of the outer edge of said side sill and having outer surfaces substantially coplanar with the outer edge of said side sill; an upper shear panel affixed to said outer surfaces of said posts and along its upper edge to said roof; a belt rail affixed to the lower edge of said upper shear panel, said belt rail including an offset edge portion extending outboard of said posts and said side sill; and a lower shear panel mounted outboard of said posts and having its upper marginal edge connected to the offset edge portion of said belt rail and along its lower marginal edge to the outer edge of said side sill, whereby the space between adjacent posts for substantially their full depth and opposite the upper and lower shear panels is unencumbered to effectively increase the usable interior width of the car.

2. In a railway car body, the combination of: a roof, a floor, a plurality of straight upright side frame posts spaced along the length of the car body, each post being secured at its lower end to the floor and at its upper end to the roof, said posts being positioned in their entirety inboard of the side edge of said floor and having outer surfaces coplanar with said side edge, an upper shear panel connected to said outer surfaces of said posts and to said roof, said shear panel including a plurality of longitudinally-spaced window openings; a belt rail having a first portion connected to the lower edge of said upper shear panel and to said posts along a line beneath said window openings and having a second portion extending outwardly of said outer surfaces; a lower shear panel positioned outboard of said upper panel and affixed along its upper margin to said second portion of said belt rail and along its lower margin to said side edge of said floor, whereby the space between adjacent posts for substantially their full depth and opposite the upper and lower shear panels is unencumbered to effectively increase the usable interior width of the car.

3. In a railway passenger car, the combination of: a floor, a roof, a plurality of side frame posts longitudinally spaced throughout the length of the car, each post being secured at its lower end to the floor and at its upper end to the roof, said posts extending inboard of the side edge of said floor and having outer surfaces coplanar therewith, an upper shear panel connected to said outer surfaces of said posts and to said roof, said shear panel including a plurality of longitudinally-spaced window openings; a belt rail having a first portion connected to the lower edge of said upper shear panel and to said posts along a line beneath said window openings and having a second portion extending outwardly of said outer surfaces; a lower shear panel affixed along its upper margin to said second portion of said belt rail and along its lower margin to said side edge of said floor, and means extending between said upper and lower margins connecting said lower shear panel to said outer surfaces of said posts whereby the space between adjacent posts for substantially their full depth and opposite the upper and lower shear panels is unencumbered to effectively increase the usable interior width of the car.

4. In a railway passenger car the combination of: a floor; a roof; and a pair of side walls, each of said side walls comprising a plurality of upright, side frame posts longitudinally spaced along the length of the car, said posts being connected at their lower ends along a side marginal edge of said floor and at their upper ends to said roof, said posts having outer surfaces coplanar with said marginal edge to define a side plane and disposed in their entirety inboard of said plane, an upper shear panel attached to the outer surfaces of the upper portions of said posts and having a plurality of longitudinally-spaced window openings; a belt rail connected to said upper shear panel along a line below said window openings and having a portion extending outwardly from said side plane; and a lower shear panel having an upper edge connected to the outwardly extending portion of said belt rail and a lower edge connected to said floor adjacent its marginal edge to support the same outboard of said side plane and said upper shear panel, whereby the space between adjacent posts of each side wall for substantially their full depth and opposite the upper and lower shear panels is unencumbered to permit utilization of the interior of the car to the width over the opposed side planes of said pair of side walls.

5. A railway passenger car in accordance with claim 4 and further including a plurality of longitudinally-spaced reinforcing means secured to the inner face of said lower shear panel and to the outer surfaces of said posts.

6. In a railway car body, the combination of: a floor, a roof, a plurality of side frame posts longitudinally spaced throughout the length of the car body, each post being secured at its lower end to the floor and at its upper end to the roof, said posts extending inboard of the side edge of said floor and having outer surfaces coplanar therewith, an upper shear panel connected to said outer surfaces of said posts and to said roof, said shear panel including a plurality of longitudinally-spaced window openings; a belt rail having a first flange portion connected to the lower edge of said upper shear panel and to said posts along a line beneath said window openings and having a second flange portion extending outwardly of said outer surfaces; a lower curved shear panel affixed along its upper margin to said second portion of said belt rail and along its lower margin to said side edge of said floor, and a plurality of reinforcing means secured in spaced relationship along the inboard face of said curved shear panel and with predetermined of said reinforcing means affixed to the outer surfaces of the lower ends of said posts, whereby the space between adjacent posts for substantially their full depth and opposite the upper and lower shear panels is unencumbered to effectively increase the usable interior width of the car.

References Cited by the Examiner
UNITED STATES PATENTS

| | | | |
|---|---|---|---|
| 1,375,787 | 4/21 | Elliott | 105—401 |
| 1,685,792 | 10/28 | Warren | 105—345 |
| 1,962,965 | 6/34 | Morrison | 296—44 |
| 2,697,990 | 12/54 | Parsons et al. | 105—401 |
| 2,758,870 | 8/56 | Nallinger | 105—401 |

EUGENE G. BOTZ, *Primary Examiner.*

LEO QUACKENBUSH, *Examiner.*